US012736489B2

(12) United States Patent
Sasakawa et al.

(10) Patent No.: US 12,736,489 B2
(45) Date of Patent: Sep. 15, 2026

(54) NMR MEASUREMENT APPARATUS, AND METHOD OF IDENTIFYING SOLVENT

(71) Applicant: JEOL Ltd., Tokyo (JP)

(72) Inventors: Hiroaki Sasakawa, Tokyo (JP); Katsuo Asakura, Tokyo (JP); Kenya Izumi, Tokyo (JP)

(73) Assignee: JEOL Ltd., Tokyo (JP)

( * ) Notice: Subject to any disclaimer, the term of this patent is extended or adjusted under 35 U.S.C. 154(b) by 1017 days.

(21) Appl. No.: 17/884,745

(22) Filed: Aug. 10, 2022

(65) Prior Publication Data

US 2023/0050786 A1 Feb. 16, 2023

(30) Foreign Application Priority Data

Aug. 11, 2021 (JP) ................................ 2021-131377

(51) Int. Cl.
*G01N 24/08* (2006.01)

(52) U.S. Cl.
CPC .................................. *G01N 24/087* (2013.01)

(58) Field of Classification Search
CPC .................................................... G01N 24/087
See application file for complete search history.

(56) References Cited

U.S. PATENT DOCUMENTS

2016/0187442 A1* 6/2016 Hachitani .......... G01R 33/3607 324/322
2020/0158668 A1* 5/2020 Hausler .............. G01R 33/4625
2020/0400766 A1 12/2020 Diehl

FOREIGN PATENT DOCUMENTS

| | | | |
|---|---|---|---|
| JP | S6475952 | A | 3/1989 |
| JP | H06235760 | A | 8/1994 |
| JP | H0749369 | A | 2/1995 |
| JP | 2020523605 | A | 8/2020 |
| JP | 2021515903 | A | 6/2021 |

OTHER PUBLICATIONS

Hones, Ian, Apr. 2005, Magnetic Resonance in Spectroscopy, 1H and 13C data to aid the identification and quantification of residual solvents by NMR spectroscopy, 43, pp. 497-509. (Year: 2005).*
University of Reading, Bruker DPX 400 MHZ, retrieved from: https://cms9-prod.rdg.ac.uk/caf/nmr-spectroscopy/bruker-dpx-400-mhz (Year: 2016).*
Jones, Ian, 1H and 13 C NMR data to aid the identification and quantification of residual solvents by NMR spectroscopy, 2005, Magnetic Resonance in Chemistry, 43, pp. 497-509. (Year: 2005).*
Extended European Search Report issued in EP22188365.5 on Dec. 13, 2022.

(Continued)

*Primary Examiner* — Charles Capozzi
*Assistant Examiner* — Alex Ramirez
(74) *Attorney, Agent, or Firm* — The Webb Law Firm

(57) ABSTRACT

An NMR spectrum is acquired from a nucleus of interest in a solvent included in a sample solution. A spectrum analyzer analyzes a number of splits, a splitting interval, a number of signals, and a signal interval based on the NMR spectrum. Based on these characteristic quantities, an identifier identifies the solvent. In another configuration, a plurality of NMR spectra acquired from a plurality of nuclei of interest included in the solvent may be analyzed.

7 Claims, 19 Drawing Sheets

(56) References Cited

OTHER PUBLICATIONS

Jones et al., Spectral Assignments and Reference Data, Magnetic Resonance in Chemistry, Apr. 2005, vol. 43, pp. 497-509.
Beyer et al., The role of solvents in the signal separation for quantitative 1H NMR spectroscopy, Journal of Pharmaceutical and Biomedical Analysis, 2010, vol. 52, pp. 51-58.
Office Action issued in JP2021131377 on Aug. 29, 2023.

* cited by examiner 10
16
13A
13
18A
22
24
18
20
14
INFORMATION PROCESSING DEVICE (PC)
12 : MAIN FRAME (SPECTROMETER)
42 : SOLVENT TABLE
40 : MAIN CONTROLLER
26 : TRANSMISSI N UNIT
28 : RECEPTION UNIT
30 : LOCKING CONTROLLER
32 : LOCKING TRANSMITTER
34 : LOCKING RECEIVER
36 : SHIMMING CONTROLLER
38 : SOLVENT IDENTIFICATION UNIT

| SOLVENT IDENTIFIER | REFERENCE FREQUENCY | ... |
|---|---|---|
| aa | f1 | ... |
| bb | f2 | ... |
| ... | ... | ... |

46 48 44

38
63
49
54 : IDENTIFIER
52 : CHARACTERISTIC QUANTITY DB
50 : SPECTRUM ANALYZER
56
58
60
62

START
INPUT MEASUREMENT CONDITION
S10
LOAD SAMPLE TUBE TO NMR PROBE
S12
TUNE NMR PROBE
S14
IDENTIFY AND SET SOLVENT
S16
ADJUST RESOLUTION ACCORDING TO SOLVENT
S18
START PERFORMING NMR LOCKING
S20
MEASURE SAMPLE
S22
END

FIG. 6

13C (Deuterated benzene)

13C (Deuterated acetone)
76
78
80
82
ΔF1
f
76A
Δd3
84a
84b
84c
84d
84e
84f
84g
78
f 94
13C (Deuterated DMSO)
90
92
f
Δd4
96e
96d
90A
92
96c
96f
96b
96g
96a
f

FIG. 11

13C (Deuterated methanol)

102A

102

104

106

108a

108b

108c

108d

108e

108f

108g

Δd5 f 13C (Deuterated acetonitrile)
116
120
ΔF2
118
122
f
116A
Δd6
124a
124b
124c
124d
124e
118
124f
124g
f

FIG. 14

D (Deuterated acetonitrile)

126

128 f

START
S30
NUMBER OF SIGNALS?
0
1
2
S34
NUMBER OF SPLITS?
3
7
S36
SPLITTING INTERVAL?
IN FB1
IN FB2
S38
SPLITTING INTERVAL?
IN FB3
IN FB4
S40
SIGNAL INTERVAL?
IN FB5
IN FB6
S32
S32a
DEUTERATED WATER
S32b
DEUTERATED BENZENE
S32c
DEUTERATED CHLOROFORM
S32d
DEUTERATED METHANOL
S32e
DEUTERATED DMSO
S32f
DEUTERATED ACETONE
S32g
DEUTERATED ACETONITRILE

FIG. 17

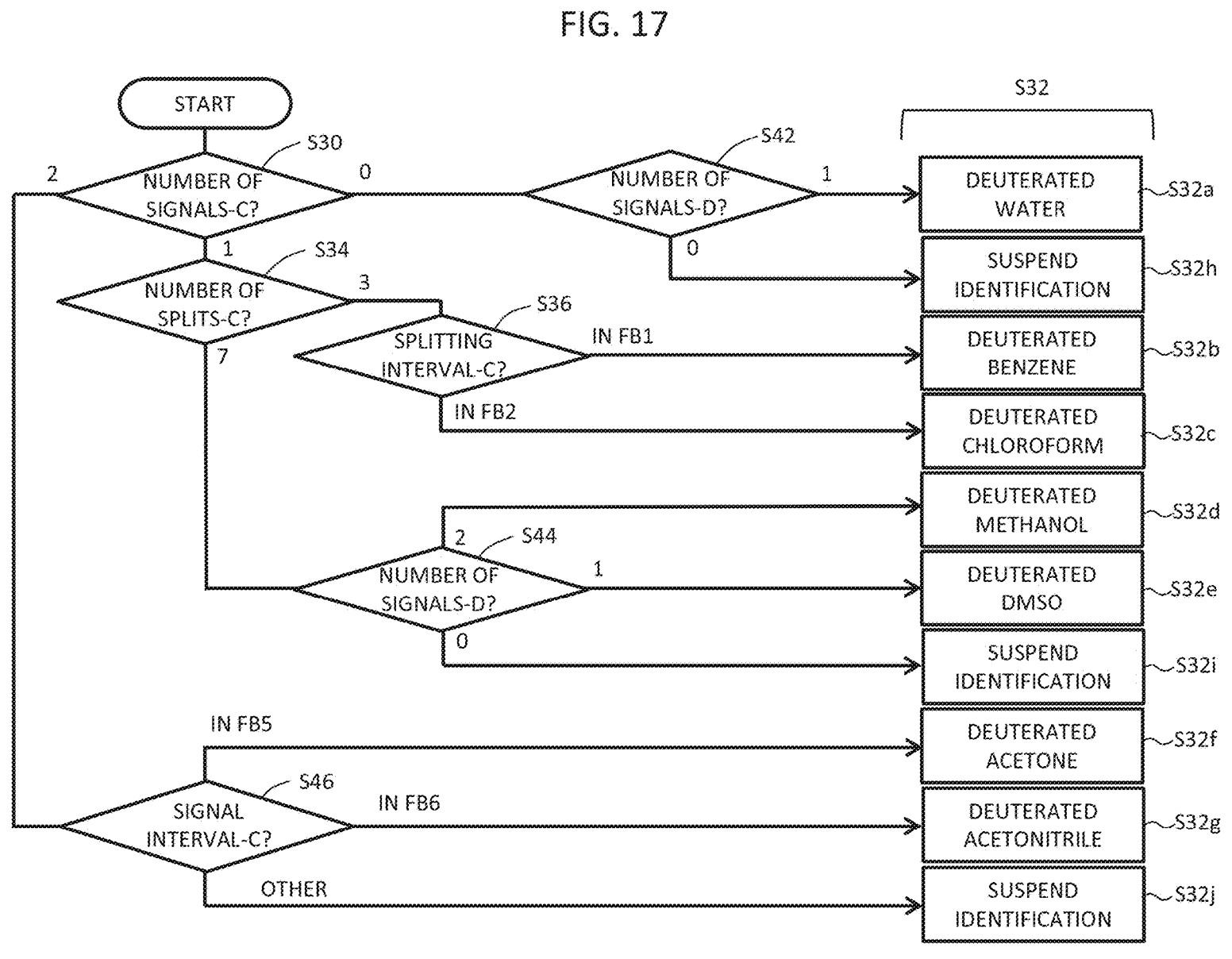

START

S30 NUMBER OF SIGNALS-C?

0

1

2

S42 NUMBER OF SIGNALS-D?

0

1

S34 NUMBER OF SPLITS-C?

3

7

S36 SPLITTING INTERVAL-C?

IN FB1

IN FB2

S44 NUMBER OF SIGNALS-D?

2

1

0

S46 SIGNAL INTERVAL-C?

IN FB5

IN FB6

OTHER

S32

S32a DEUTERATED WATER

S32h SUSPEND IDENTIFICATION

S32b DEUTERATED BENZENE

S32c DEUTERATED CHLOROFORM

S32d DEUTERATED METHANOL

S32e DEUTERATED DMSO

S32i SUSPEND IDENTIFICATION

S32f DEUTERATED ACETONE

S32g DEUTERATED ACETONITRILE

S32j SUSPEND IDENTIFICATION

FIG. 18

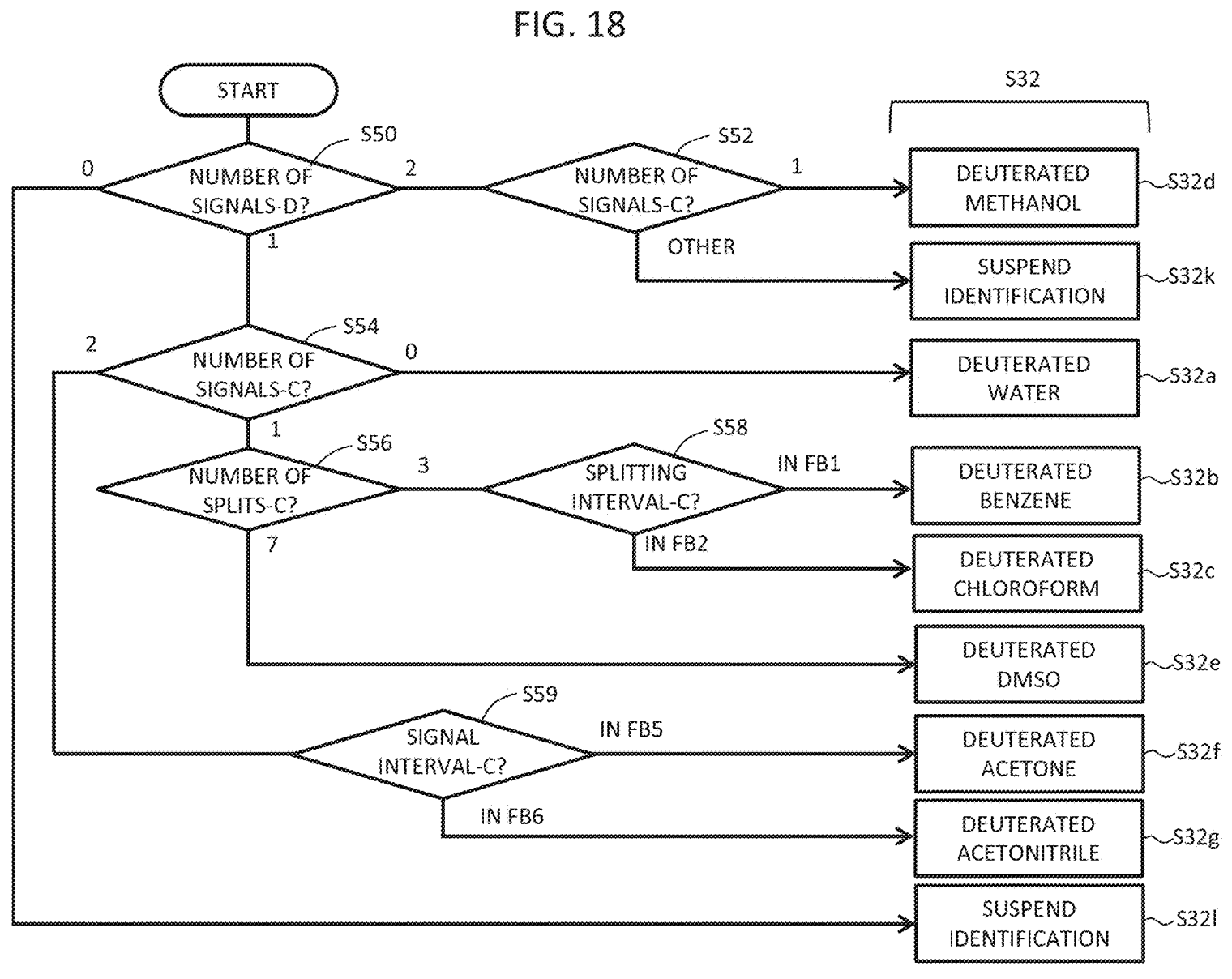

START

S50 NUMBER OF SIGNALS-D?
2 / 1 / 0

S52 NUMBER OF SIGNALS-C?
1 / OTHER

S54 NUMBER OF SIGNALS-C?
0 / 1 / 2

S56 NUMBER OF SPLITS-C?
3 / 7

S58 SPLITTING INTERVAL-C?
IN FB1 / IN FB2

S59 SIGNAL INTERVAL-C?
IN FB5 / IN FB6

S32

S32d DEUTERATED METHANOL

S32k SUSPEND IDENTIFICATION

S32a DEUTERATED WATER

S32b DEUTERATED BENZENE

S32c DEUTERATED CHLOROFORM

S32e DEUTERATED DMSO

S32f DEUTERATED ACETONE

S32g DEUTERATED ACETONITRILE

S32l SUSPEND IDENTIFICATION

NMR MEASUREMENT APPARATUS, AND METHOD OF IDENTIFYING SOLVENT

CROSS REFERENCE TO RELATED APPLICATION

This application claims priority to Japanese Patent Application No. 2021-131377 filed Aug. 11, 2021, the disclosure of which is hereby incorporated by reference in its entirety.

BACKGROUND OF THE DISCLOSURE

Field of the Disclosure

The present disclosure relates to an NMR measurement apparatus and a method of identifying a solvent, and in particular to a technique for identifying a solvent included in a sample solution in a sample tube.

Description of Related Art

In NMR (Nuclear Magnetic Resonance) measurement, an atomic nucleus of a particular element in a sample is illuminated with an electromagnetic wave, the electromagnetic wave having a frequency intrinsic to the element (resonance frequency), and an NMR caused in the atomic nucleus due to the illumination with the electromagnetic wave is detected. Through frequency analysis of an NMR detection signal acquired by the detection, an NMR spectrum is generated. The sample is analyzed based on the NMR spectrum. An apparatus which performs the NMR measurement is called an NMR measurement apparatus or a nuclear magnetic resonance measurement apparatus.

A sample solution which is a target of NMR measurement is prepared by adding sample to a solvent. A typical solvent is a solvent which includes deuterium (deuterated solvent). Currently, various deuterated solvents are commercially available. When the deuterated solvent is used in the NMR measurement, generally, a reference for a chemical shift is determined based on an NMR signal acquired from the deuterium in the sample solvent (deuterium signal). The reference is one of the most important indices in the NMR measurement. In the following, the deuterium will also be described as "D".

A position of the deuterium signal in the NMR spectrum (that is, a frequency of the deuterium signal) varies according to the type of the deuterated solvent. In the NMR measurement apparatus, a reference frequency is managed for each type of the deuterated solvent. Prior to the NMR measurement of the solution sample, the deuterated solvent to be used is designated by a user. Based on a reference frequency corresponding to the designated deuterated solvent, the chemical shift or the like of the NMR signal acquired from the sample is calculated.

The deuterium signal is also used in NMR locking. NMR locking is a mechanism in which a correction magnetic field is added to a static magnetic field to cancel a variation in time of the magnetic field, so that the static magnetic field experienced by the sample solution is stabilized in time. With NMR locking, the NMR measurement can be performed stably over a long period of time. The deuterium signal may also be used in shimming. Shimming is an adjustment for increasing uniformity of the static magnetic field in a sample space; that is, an adjustment to increase resolution of the NMR measurement. Shimming is also called shim adjustment.

In some cases, a reference for the chemical shift may be determined based on an NMR signal from an atomic nucleus of an element other than deuterium (such as 31P, 19F, or the like). In some cases, such a signal is used for NMR locking or the like. In the present disclosure, a number shown in front of an element sign represents the mass number (for example, 13C=$^{13}$C).

In an NMR measurement apparatus disclosed in JP H7-49369 A, the solvent is identified based on a difference (frequency difference) between an NMR signal acquired from a reference solution and an NMR signal acquired from the sample solution. In an NMR measurement apparatus disclosed in JP H6-235760 A, the solvent is identified based on a frequency of a locking signal. In an NMR measurement apparatus disclosed in JP S64-75952 A, the solvent is identified based on a magnetic field control value for locking. None of JP H7-49369 A, JP H6-235760 A, and JP S64-75952 A discloses use of a form of peak splitting due to the Zeeman effect; that is, splitting information, for identifying the solvent.

In an NMR measurement apparatus, when the user is to be requested to identify the solvent included in the sample solution prior to the NMR measurement of the sample solution, a burden is caused for the user, and also, there is a possibility of an erroneous setting.

SUMMARY OF THE DISCLOSURE

An advantage of the present disclosure lies in provision of a technique which enables automatic identification of a solvent included in a sample solution. Alternatively, an advantage of the present disclosure lies in provision of a technique which enables precise identification of a solvent included in a sample solution.

According to one aspect of the present disclosure, there is provided an NMR measurement apparatus comprising: an acquisition unit that acquires, from a nucleus of interest in a solvent included in a sample solution, an NMR spectrum including a characteristic portion intrinsic to the nucleus of interest; an analyzer that analyzes the characteristic portion, to thereby identify splitting information for a particular nucleus-of-interest signal included in the characteristic portion; and an identifier that identifies the solvent based on the splitting information.

According to another aspect of the present disclosure, there is provided a method of identifying a solvent, the method comprising: acquiring, from a nucleus of interest in a solvent included in a sample solution, an NMR spectrum including a characteristic portion intrinsic to the nucleus of interest; analyzing the characteristic portion, to thereby identify splitting information for a particular nucleus-of-interest signal included in the characteristic portion; and identifying the solvent based on the splitting information.

BRIEF DESCRIPTION OF DRAWINGS

Embodiment(s) of the present disclosure will be described based on the following figures, wherein:

FIG. 2 is a diagram showing an example of a solvent table;

FIG. 6 is a diagram showing an NMR spectrum acquired from 13C in a deuterated benzene solvent;

FIG. 7 is a diagram showing an NMR spectrum acquired from 13C in a deuterated acetone solvent;

FIG. 11 is a diagram showing an NMR spectrum acquired from 13C in a deuterated methanol solvent;

FIG. 14 is a diagram showing an NMR spectrum acquired from D in a deuterated acetonitrile solvent;

FIG. 17 is a flowchart showing a method of identifying a solvent according to a second configuration;

FIG. 18 is a flowchart showing a method of identifying a solvent according to a third configuration.

DESCRIPTION OF THE DISCLOSURE

Figure 1:
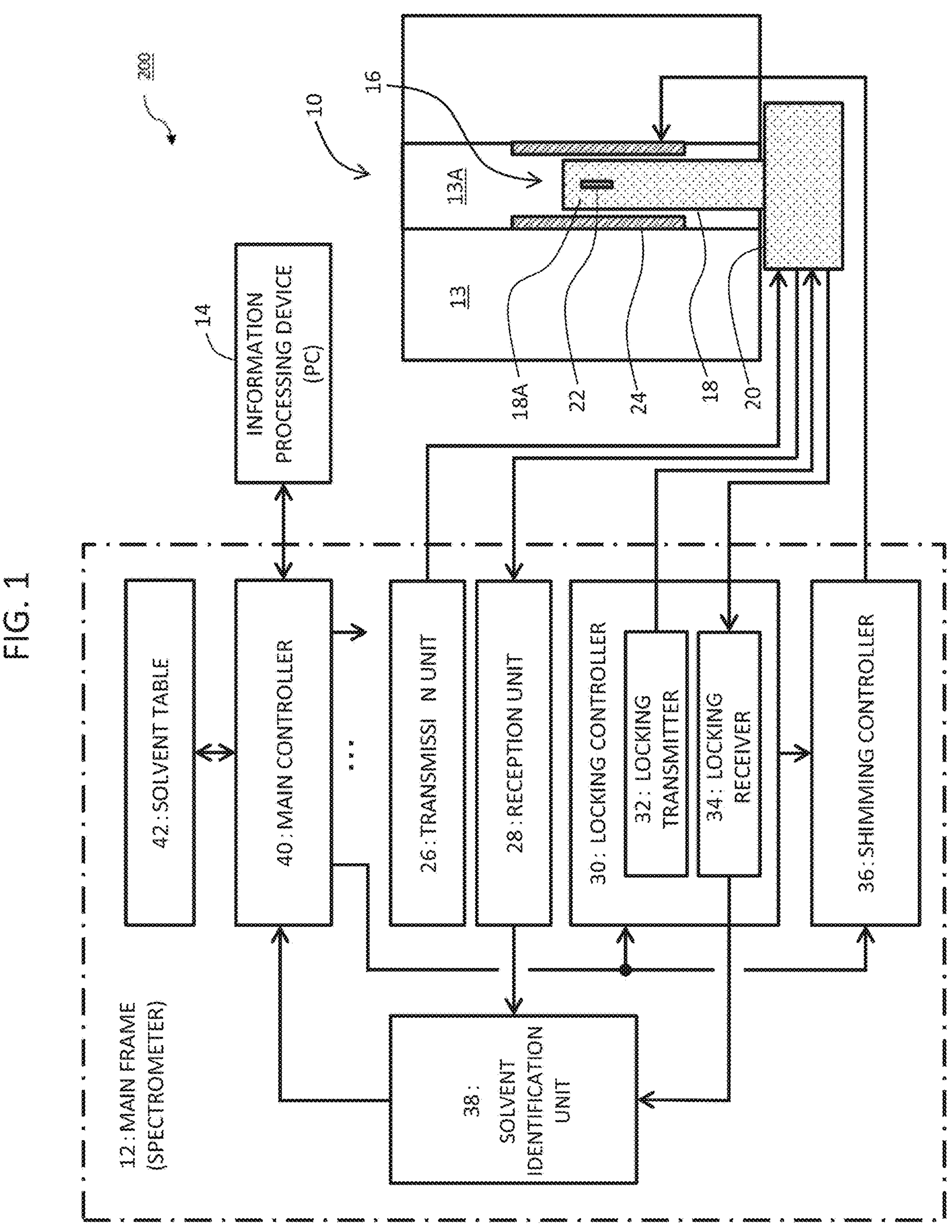
FIG. 1 is a diagram showing an example structure of an NMR measurement apparatus according to an embodiment of the present disclosure.

An embodiment of the present disclosure will now be described with reference to the drawings.

(1) Overview of Embodiment

An NMR measurement apparatus according to an embodiment of the present disclosure comprises an acquisition unit, an analyzer, and an identifier. The acquisition unit acquires, from a nucleus of interest in a solvent included in a sample solution, an NMR spectrum including a characteristic portion intrinsic to the nucleus of interest. The acquisition unit corresponds to a reception unit or a receiver to be described later. The analyzer analyzes the characteristic portion, to thereby identify splitting information for a particular nucleus-of-interest signal included in the characteristic portion. The identifier identifies the solvent based on the splitting information.

A plurality of types of solvents which are targets of identification may include the same element. Even for nucleus-of-interest signals (NMR signals) acquired from nuclei of interest of the same element, if the solvent differs, the splitting states in the nucleus-of-interest signals differ from each other. For example, the signals may differ in number of splits and/or splitting interval. It may also be described that peak patterns caused by the splitting differ from each other. The above-described structure takes advantage of the splitting state's dependency on the type of solvent, and identifies the solvent based on the splitting information showing the splitting state. That is, the above-described structure takes advantage of the splitting information being information intrinsic to the solvent, and identifies the solvent based thereon.

The splitting information basically does not depend on a position of a nucleus-of-interest signal (that is, a static magnetic field intensity) on the horizontal axis (frequency axis) in the NMR spectrum. Even when there is a dependency, the dependency is very small. For example, when the static magnetic field intensity is varying, the nucleus-of-interest signal moves along the horizontal axis, but the splitting information does not change (J-coupling does not change). Therefore, even in a state before the horizontal axis is calibrated, the solvent can be identified based on the splitting information.

A large number of the nucleus of interest are included in the solvent, and a strong NMR signal can be acquired from the large number of nucleus of interest. Thus, a measurement time required for acquiring the splitting information can be shortened. Because of this, the splitting information can be identified precisely even before start of performance of NMR locking.

In an embodiment of the present disclosure, the analyzer identifies a number of splits and a splitting interval as the splitting information. The identifier identifies the solvent based on the number of splits and the splitting interval. The number of splits and the splitting interval are information intrinsic to the solvent, and precision of solvent identification can be improved using both the number of splits and the splitting interval.

In an embodiment of the present disclosure, the analyzer further identifies a number of nucleus-of-interest signals forming the characteristic portion. The identifier identifies the solvent based further on the number of the nucleus-of-interest signals. The number of the nucleus-of-interest signals (more specifically, a number of peak groups) acquired from the nucleus of interest differs according to the solvent. That is, the number of the nucleus-of-interest signals is information intrinsic to the solvent or information equivalent thereto. With the use of the number of splits, the splitting interval, and the number of the nucleus-of-interest signals, a solvent identification target range can be widened, and the precision of solvent identification can be improved. The number of the nucleus-of-interest signals is also a characteristic quantity which does not depend on the intensity of the static magnetic field.

In an embodiment of the present disclosure, the analyzer further identifies a signal interval in the characteristic portion. The identifier identifies the solvent based further on the signal interval. The signal interval is also information intrinsic to the solvent or information equivalent thereto. Alternatively, information used for the solvent identification may be chosen according to a plurality of types of solvents which are the identification targets. The signal interval depends on the intensity of the static magnetic field. However, when the intensity of the static magnetic field is known and is generally stable, the signal interval may be used as a characteristic quantity.

In an embodiment of the present disclosure, the nucleus of interest is a first nucleus of interest. The NMR spectrum is a first NMR spectrum including a first characteristic portion intrinsic to the first nucleus of interest. The acquisition unit includes a first acquisition unit which acquires the first NMR spectrum, and a second acquisition unit which acquires, from a second nucleus of interest included in the solvent, a second NMR spectrum including a second characteristic portion intrinsic to the second nucleus of interest. The analyzer analyzes the first NMR spectrum, to thereby identify a number of nucleus-of-interest signals forming the first characteristic portion. The analyzer also analyzes the second NMR spectrum, to thereby identify a number of nucleus-of-interest signals forming the second characteristic portion. The identifier identifies the solvent based on the splitting information, the number of the nucleus-of-interest signals forming the first characteristic portion, and the number of the nucleus-of-interest signals forming the second characteristic portion.

The above-described structure identifies the solvent with higher precision, based on one or a plurality of NMR signals corresponding to the first nucleus of interest, and one or a plurality of NMR signals corresponding to the second nucleus of interest. In an embodiment of the present disclosure, the first nucleus of interest is an atomic nucleus of an element other than deuterium (for example, 13C), and the second nucleus of interest is an atomic nucleus of deuterium (D). Alternatively, the first nucleus of interest may be an atomic nucleus of an element other than 13C, and the second nucleus of interest may be an atomic nucleus of an element other than D.

An NMR measurement apparatus according to an embodiment of the present disclosure may further comprise a solvent table for managing a reference frequency for each solvent. A reference frequency corresponding to the identified solvent is identified based on the solvent table. An operation of the NMR measurement apparatus is adjusted according to the reference frequency. The reference frequency is set as a reference when a frequency shift is calculated, is referred to when the NMR locking is performed, or is referred to when shimming is performed. Alternatively, an illumination intensity, a reception sensitivity, or the like may be further managed in the solvent table.

A method of identifying a solvent according to an embodiment of the present disclosure includes an acquisition step, an analysis step, and an identification step. In the acquisition step, an NMR spectrum including a characteristic portion intrinsic to a nucleus of interest is acquired from the nucleus of interest in a solvent included in a sample solution. In the analysis step, the characteristic portion is analyzed, to thereby identify splitting information for a particular nucleus-of-interest signal included in the characteristic portion. In the identification step, the solvent is identified based on the splitting information.

(2) Details of Embodiment

FIG. 1 shows an NMR measurement apparatus 200 according to an embodiment of the present disclosure. The NMR measurement apparatus 200 is an apparatus which illuminates an atomic nucleus of a particular element in a sample with an electromagnetic wave having a predetermined frequency (resonance frequency), and detects an NMR caused in the atomic nucleus. An NMR spectrum is generated based on a reception signal acquired by the detection of the NMR. The sample is analyzed based on the NMR spectrum.

In the illustrated example structure, the NMR measurement apparatus 200 comprises a measurement unit 10, a main frame (spectrometer) 12, and an information processing device (PC) 14. Illustration of electronic circuits provided between the measurement unit 10 and the main frame 12 is omitted.

The measurement unit 10 has a static magnetic field generator 13 and an NMR probe 16. The static magnetic field generator 13 is formed from, for example, a superconductive magnet, and generates a static magnetic field. The static magnetic field generator 13 has a bore 13A serving as a vertical through hole.

The NMR probe 16 is formed from an insertion portion 18 and a base portion 20. The insertion portion 18 is inserted into the bore 13A. The base portion 20 is provided immediately below and external to the bore 13A. A tip of the insertion portion 18 is a probe head 18A. A sample tube 22 is placed in the probe head 18A. An NMR detection coil is provided near the sample tube 22. An electronic circuit for tuning and an electronic circuit for matching are provided in the probe head 18A. The particular atomic nucleus in the sample tube 22 is illuminated with an electromagnetic wave from the NMR detection coil. The NMR caused in the particular atomic nucleus is detected by the NMR detection coil.

A sample solution is housed in the sample tube 22. In the embodiment, the sample solution is prepared by adding the sample to a deuterated solvent (organic solvent in which hydrogen is replaced with deuterium). Examples of deuterated solvents which can be used include a deuterated chloroform solvent, a deuterated benzene solvent, a deuterated acetone solvent, a deuterated DMSO (deuterated dimethyl sulfoxide) solvent, a deuterated methanol solvent, and a deuterated acetonitrile solvent. These solvents are typically used in an NMR measurement of a sample solution. All of these solvents include 13C. A ratio of 13C to 12C in the solvent depends on a natural existence ratio of 13C. Alternatively, deuterated water may be used as the solvent.

A coil unit 24 for shimming is provided in the bore 13A. The coil unit 24 is formed from a plurality of coils. By controlling a group of excitation currents supplied to the coil unit 24, shimming is performed. That is, in a sample space including the sample, a correction magnetic field is added to the static magnetic field, so that the uniformity of the static magnetic field intensity over the sample space as a whole is improved. With this configuration, peaks in the NMR spectrum are narrowed. That is, the resolution is improved.

When NMR locking is performed, for example, the deuterium in the sample tube 22 is illuminated with an electronic wave from the NMR coil, and the NMR caused in the deuterium is detected. The group of excitation currents supplied to the coil unit 24 are dynamically controlled so that the deuterium signal occurs at a predetermined frequency in the NMR spectrum acquired by the detection of the NMR.

Next, the main frame 12 will be described. A transmission unit 26 is an electronic circuit which generates a transmission signal for NMR observation. The generated transmission signal is sent to the NMR probe 16. A reception unit 28 is an electronic circuit which processes an NMR reception signal, as a receiver. The reception unit 28 has an orthogonal wave detection circuit, a frequency analyzing circuit, or the like. The NMR spectrum is generated based on the NMR reception signal. The NMR spectrum is analyzed by a main controller 40 to be described later.

In the present embodiment, in a solvent identifying step, the transmission unit 26 generates a transmission signal suitable for a nucleus of interest in the solvent. The nucleus of interest is 13C in a first configuration described below, and is 13C and D in each of a second configuration and a third configuration described below. Alternatively, the transmission signal for the nucleus of interest may be generated by a locking transmitter 32 to be described later. The reception unit 28 generates an NMR spectrum based on an NMR reception signal acquired from the nucleus of interest. A solvent identification unit 38 analyzes the NMR spectrum.

Alternatively, the NMR spectrum may be generated by a locking receiver 34 to be described later, and analyzed by the solvent identification unit 38. The reception unit 28 and the locking receiver 34 correspond to an acquisition unit (first acquisition unit, second acquisition unit) or an acquisition device (first acquisition device, second acquisition device) which acquires the NMR spectrum.

A locking controller 30 controls NMR locking. The locking controller 30 comprises the locking transmitter 32 and the locking receiver 34. In the NMR locking state, a locking transmission signal is supplied from the locking transmitter 32 to the NMR probe 16. A locking NMR reception signal from the NMR probe 16 is supplied to the locking receiver 34. The locking receiver 34 has, for example, a structure similar to that of the reception unit 28. An NMR spectrum is generated at the locking receiver 34. An operation of the coil unit 24 is controlled such that a predetermined signal in the NMR spectrum is localized at a predetermined frequency. More specifically, locking control information is supplied to a shimming controller 36. Alternatively, the transmission unit 26 may function as the locking transmitter 32, and the reception unit 28 may function as the locking receiver 34.

The shimming controller 36 performs shimming by controlling the group of excitation currents supplied to the coil unit 24. As described above, the shimming controller 36 also functions in the NMR locking.

The solvent identification unit 38 functions in the solvent identifying step executed prior to a sample measurement step. The solvent identification unit 38 analyzes the NMR spectrum acquired from the atomic nucleus of the element of interest included commonly in a plurality of types of deuterated solvents described above, and identifies the type of the solvent based on the result of the analysis. Through the analysis of the NMR spectrum, a number of nucleus-of-interest signals, and splitting information (number of splits and splitting interval) are identified. The number of the nucleus-of-interest signals is a number of the nucleus-of-interest signals included in the NMR spectrum, and is more specifically a number of peak groups. The splitting information is intrinsic information for a plurality of peaks in a split state, forming a particular nucleus-of-interest signal. In the following, the nucleus-of-interest signal will be simply referred to as a "signal". Further, the number of the nucleus-of-interest signals will be simply referred to as a "number of signals". The solvent identification unit 38 outputs to the main controller 40 a solvent identifier indicating the identified solvent.

The main controller 40 controls operations of various components in the main frame 12 according to commands or information sent from the information processing device 14 serving as a terminal device. Alternatively, an element and a pulse sequence to be measured may be selected at the information processing device 14. The main controller 40 identifies information (such as a reference frequency) corresponding to the identified solvent by referring to a solvent table 42, and controls operations of the NMR measurement apparatus according to the information.

Specifically, the main controller 40 controls transmission, reception, data processing, or the like according to the information. The control includes setting of a chemical shift reference, setting of NMR locking conditions, or the like. The solvent table 42 is information stored on a memory. Alternatively, information for identifying a name of a solvent or the like may be transferred from the main controller 40 to the information processing device 14, and displayed on the information processing device 14.

The shimming controller 36, the solvent identification unit 38, and the main controller 40 are each formed from a processor which executes a program. Alternatively, the shimming controller 36, the solvent identification unit 38, and the main controller 40 may be formed from a single processor. Other modules included in the main frame are formed from a processor, an electronic circuit, or the like. Examples of the processor include a CPU, a GPU, an FPGA, or the like.

FIG. 2 shows an example of the solvent table 42. The solvent table 42 has a plurality of records 44 corresponding to the plurality of types of solvents. Each record includes information such as a solvent identifier 46, a reference frequency 48, or the like. The chemical shift reference or the like is determined based on the reference frequency 48. Alternatively, each record 44 may include other information for control. Examples of the other information include illumination intensity, reception sensitivity, or the like.

Figure 3:
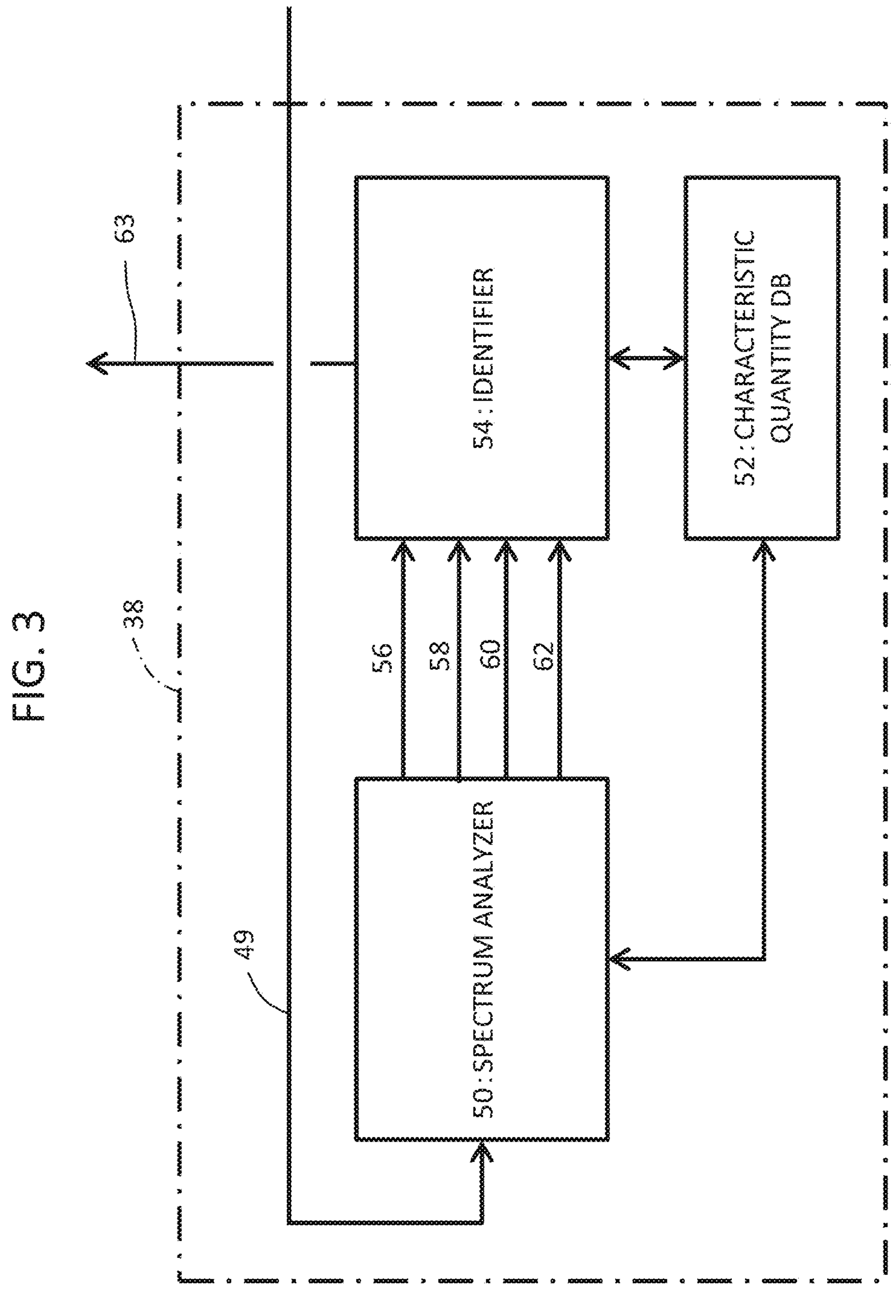
FIG. 3 is a block diagram showing a first example structure of a solvent identifying unit.

FIG. 3 shows a first example structure of the solvent identification unit 38. The solvent identification unit 38 has a spectrum analyzer 50, a characteristic quantity DB (database) 52, and an identifier 54. The spectrum analyzer 50 analyzes an NMR spectrum 49 acquired from 13C in the solvent. The NMR spectrum 49 includes one or a plurality of signals (one or a plurality of nucleus-of-interest signals) caused from 13C. The entirety of the one or the plurality of signals is a characteristic portion intrinsic to 13C. The spectrum analyzer 50 analyzes the characteristic portion. Of the one or the plurality of signals included in the characteristic portion, a particular signal (for example, a signal caused on a lower frequency side) is set as an analysis target; that is, a target for identifying splitting information.

The characteristic quantity DB 52 has a plurality of records corresponding to the plurality of types of solvents. Each record includes a plurality of information necessary for the spectrum analysis and a plurality of information (a plurality of characteristic quantities) necessary for the solvent identification. For example, each record has information such as a frequency range of the characteristic portion, a number of signals, a frequency range for each signal, a signal interval, a number of splits of a particular signal, a splitting interval of the particular signal, or the like. The characteristic quantity DB 52 is constructed on a memory.

The spectrum analyzer 50 analyzes the NMR spectrum 49 based on the characteristic quantity DB 52, and outputs, as a result of the analysis, a plurality of characteristic quantities which are identified. The plurality of characteristic quantities include a number of splits 56, a splitting interval 58, a number of signals 60, and a signal interval 62. When the NMR spectrum 49 only includes one signal, the number of signals 60 is 1, and the signal interval 62 is not calculated.

The identifier 54 identifies the solvent in the sample tube while referring to the characteristic quantity DB 52 and based on the analysis result of the spectrum analyzer 50. Specifically, the identifier 54 selects a solvent which matches in the number of splits 56, the splitting interval 58, the number of signals 60, and the signal interval, from among the plurality of types of solvents. In this process, for each candidate solvent, the identifier 54 determines a first judgment range for the splitting interval, and judges whether or not the splitting interval 58 is within the first judgment range. In addition, for each candidate solvent, the identifier 54 sets a second judgment range for the signal interval, and judges whether or not the signal interval 62 is within the second judgment range.

In the embodiment, the identifier 54 stepwise narrows the solvent candidate. The identifier 54 outputs to the main controller a solvent identifier 63 indicating the solvent which is finally identified.

Figure 4:
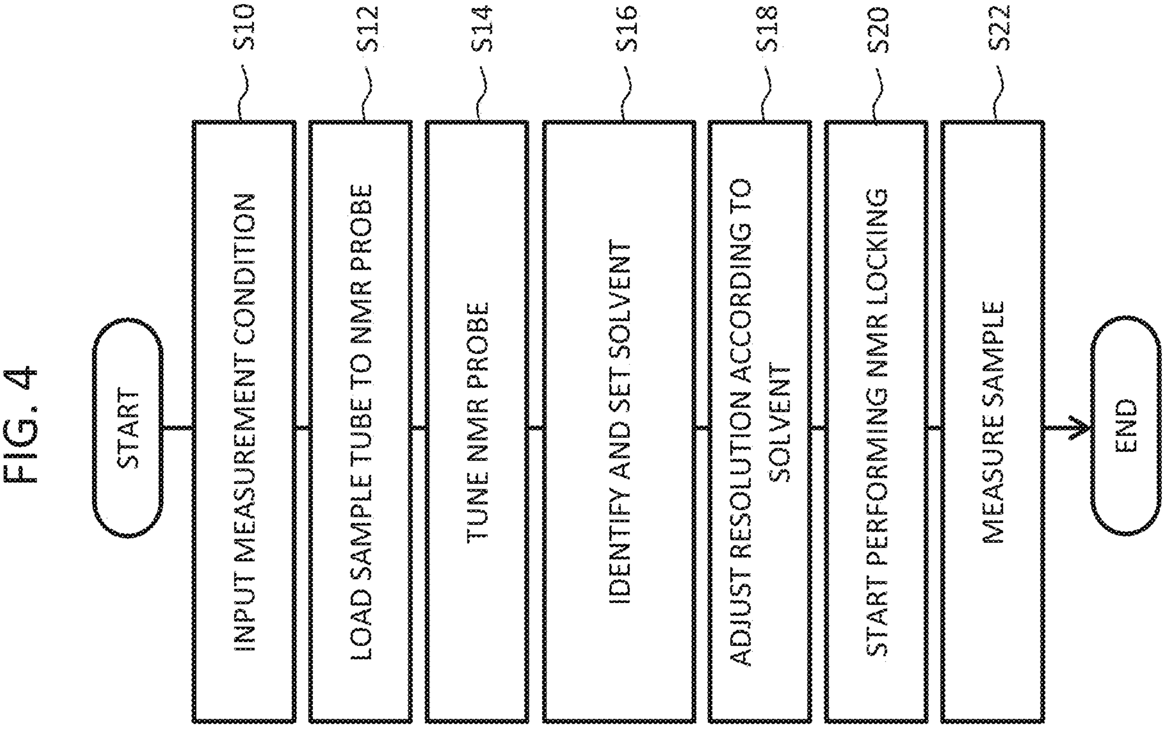
FIG. 4 is a diagram showing an example operation of an NMR measurement apparatus according to an embodiment of the present disclosure.

FIG. 4 shows an example operation of the NMR measurement apparatus shown in FIG. 1. In S10, a measurement condition is input by a user. In S10, the user does not need to designate the type of the solvent. In S12, the sample solution is prepared, and the sample tube including the sample solution is loaded in the NMR probe. In S14, tuning and matching are performed for the NMR probe.

In S16, the nucleus of interest in the solvent included in the sample solution is illuminated with the electromagnetic wave, and the NMR spectrum is thereby acquired. The NMR spectrum is analyzed, and analysis result including the splitting information is acquired. Based on the analysis result, the solvent which is currently used is identified.

In S18, resolution adjustment; that is, shimming, is performed according to information such as the reference frequency identified from the identified solvent. In S20, performance of the NMR locking is started according to the information such as reference frequency identified from the identified solvent. In S22, the sample is measured. That is, the NMR spectrum of the sample is acquired.

With reference to FIGS. 5 to 14, characteristics of 13C-NMR spectrum (and D-NMR spectrum) for the six solvents described above will now be described.

Figure 5:
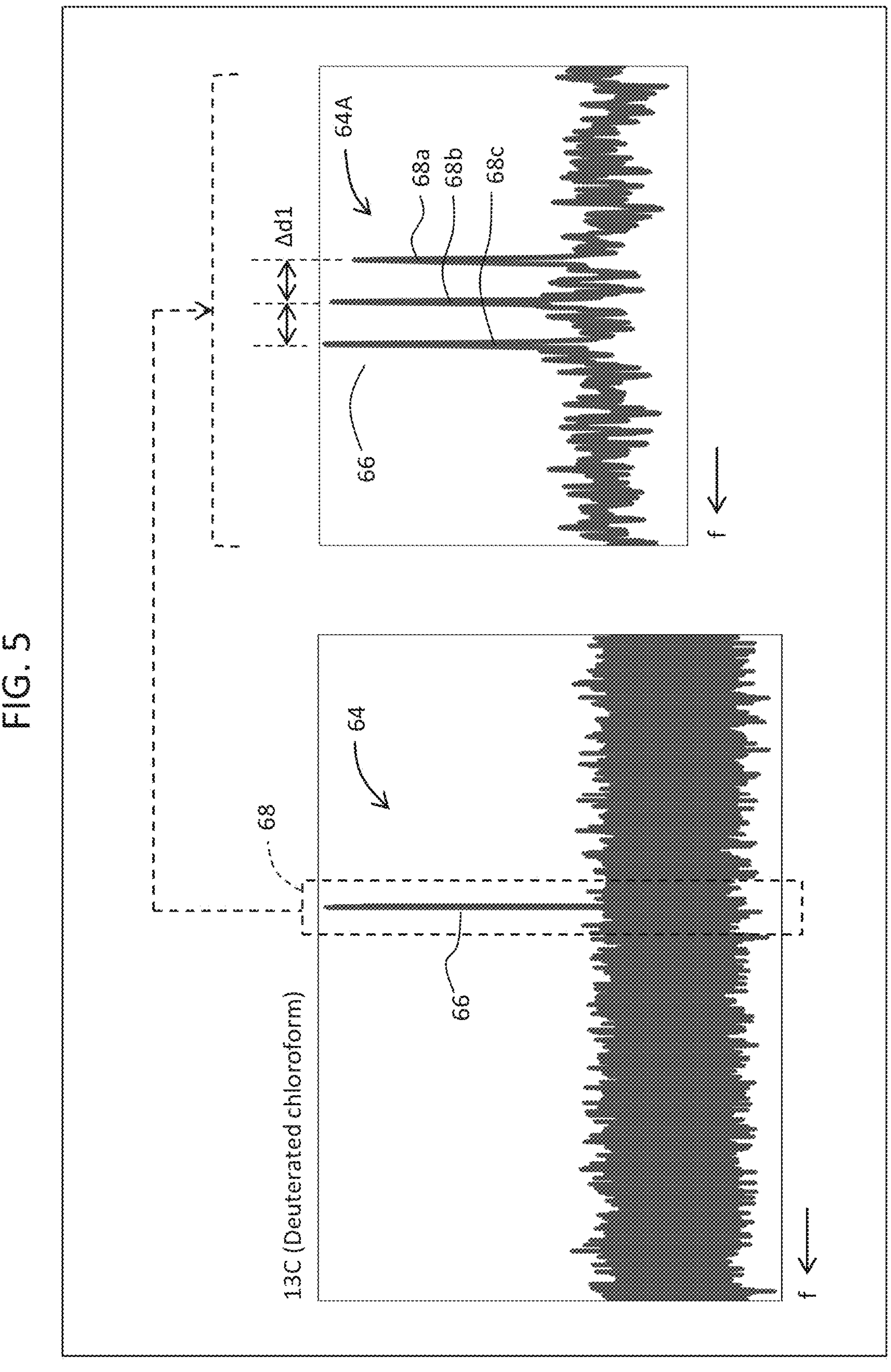
FIG. 5 is a diagram showing an NMR spectrum acquired from 13C in a deuterated chloroform solvent.

At the left of FIG. 5, there is shown an NMR spectrum 64 which is acquired from 13C in the deuterated chloroform solvent. The NMR spectrum 64 includes, as the characteristic portion, one signal 66 derived from 13C. A range shown by reference numeral 68 is enlarged and shown at the right of FIG. 5 as an enlarged NMR spectrum 64A. The signal 66 is formed from three peaks 68*a*~68*c* caused by splitting (which may also be called J coupling). The number of splits of the signal 66 is 3, and the splitting interval of the signal 66 is Δd1 (around 30 Hz).

The three peaks include two intervals, of identical size. The number of splits of 3 and the splitting interval of Δd1 basically do not depend on the static magnetic field intensity. Even when there is a dependency, the dependency is very small. In detection of the signal 66 or the three peaks 68*a*~68*c*, a threshold process or the like may be applied. While the frequency at which the signal 66 is generated is known, in a situation where NMR locking is not performed, a position of the signal 66 may change along the horizontal axis of the NMR spectrum due to a change of the static magnetic field intensity. A frequency range for detecting the signal 66 may be determined in consideration of such a change. The items described above are similarly applicable when the other NMR spectra are analyzed.

Figure 6:
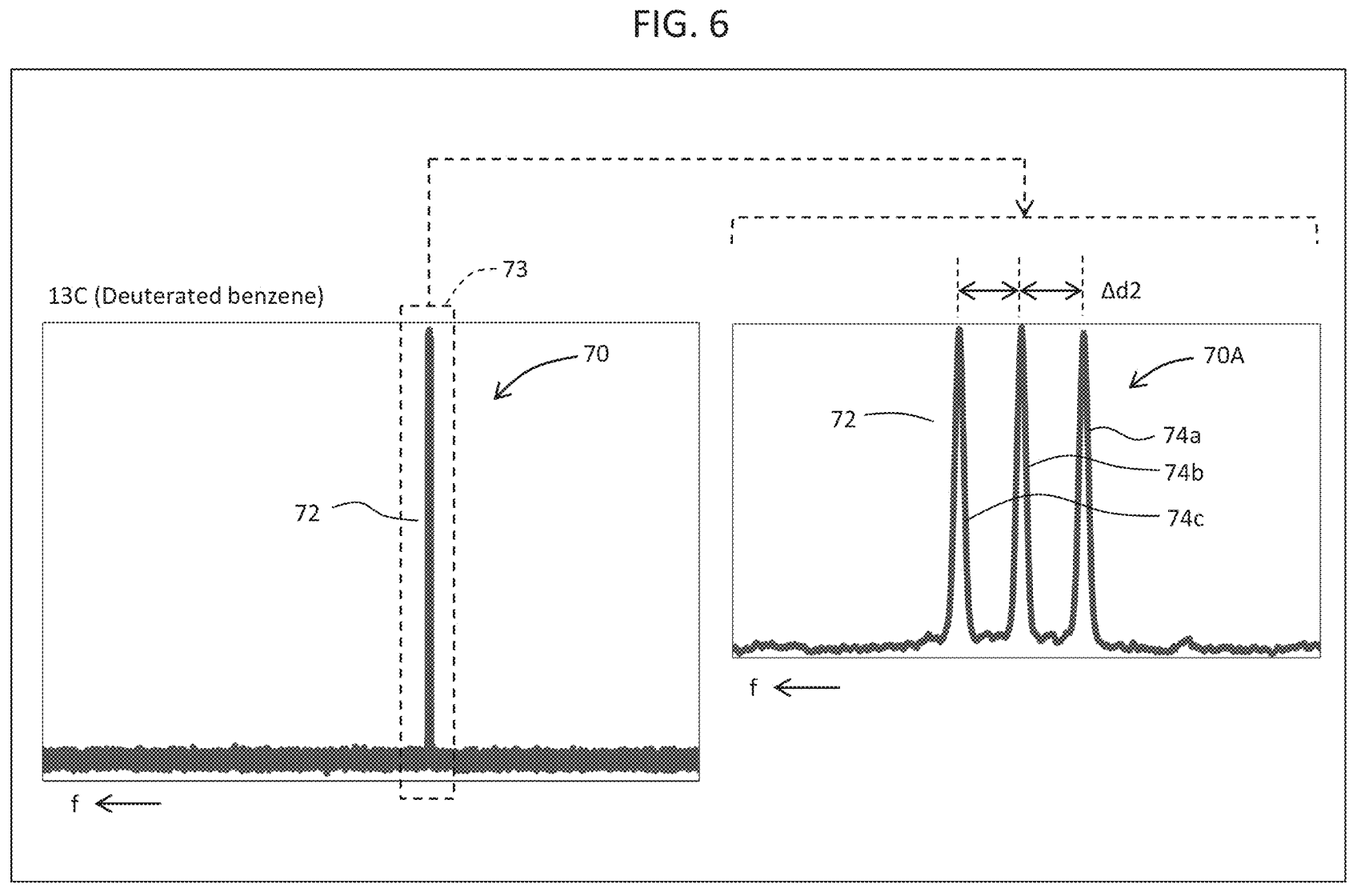

At the left of FIG. 6, there is shown an NMR spectrum 70 which is acquired from 13C in the deuterated benzene solvent. The NMR spectrum 70 includes, as the characteristic portion, one signal 72 derived from 13C. A range shown by reference numeral 73 is enlarged and shown at the right of FIG. 6 as an enlarged NMR spectrum 70A. The signal 72 is formed from three peaks 74*a*~74*c* caused by splitting. The number of splits of the signal 72 is 3 and the splitting interval of the signal 72 is Δd2 (around 25 Hz).

Figure 7:
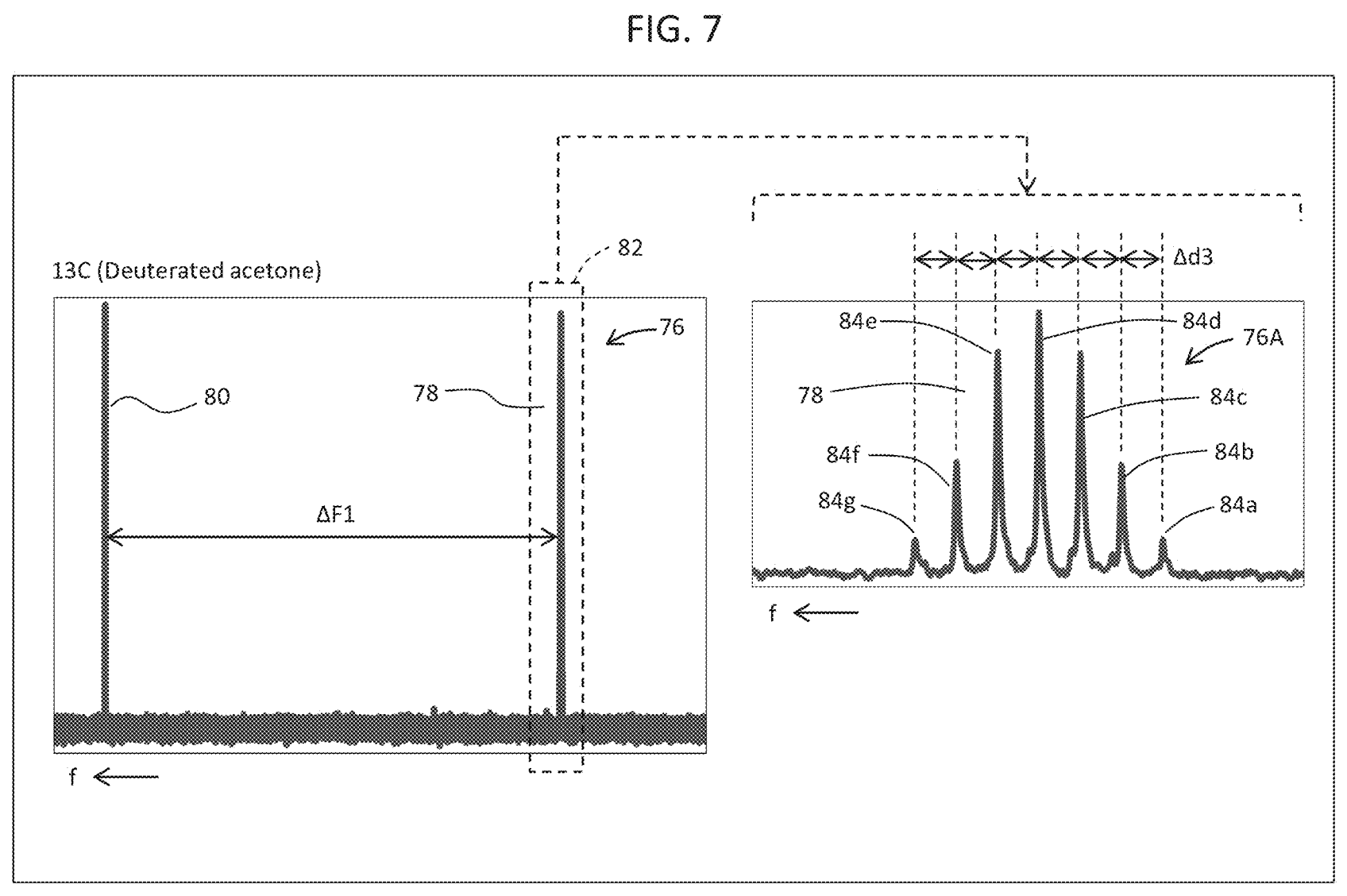

At the left of FIG. 7, there is shown an NMR spectrum 76 which is acquired from 13C in the deuterated acetone solvent. The NMR spectrum 76 includes, as the characteristic portion, two signals 78, 80 derived from 13C. The signal interval is ΔF1 (around 22 kHz under a certain magnetic field intensity). Positions of the two signals 78, 80, and an interval thereof change depending on a change of the static magnetic field intensity. A range shown by reference numeral 82 (range including the signal 78 at the lower frequency side) is enlarged and shown at the right of FIG. 7 as an enlarged NMR spectrum 76A. The signal 78 is formed from 7 peaks 84*a*~84*g* caused by splitting. The number of splits of the signal 78 is 7, and the splitting interval of the signal 78 is Δd3 (around 19.5 Hz).

Figure 8:
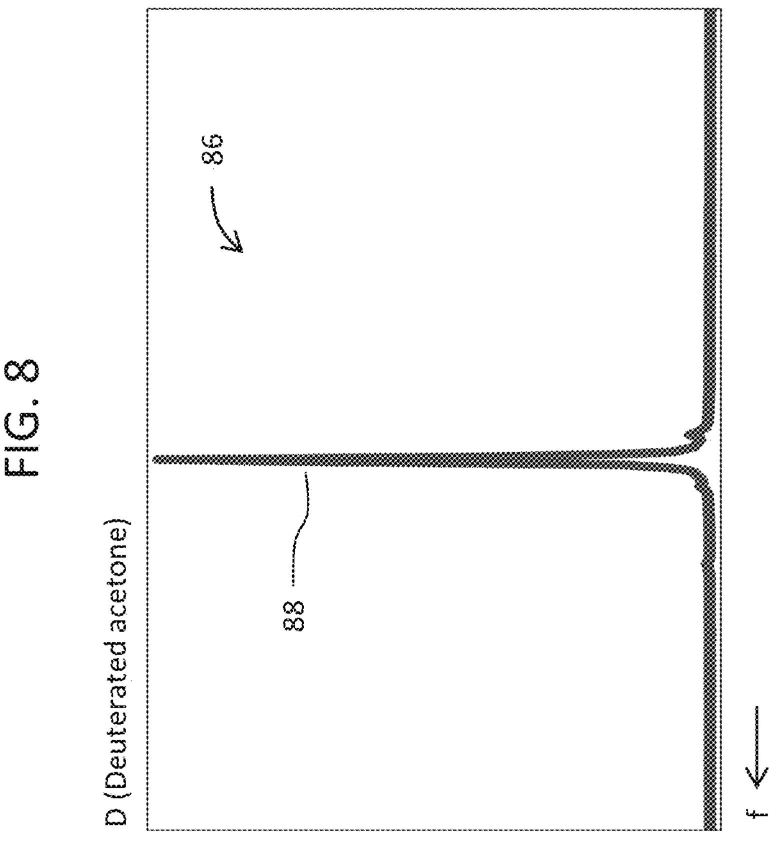
FIG. 8 is a diagram showing an NMR spectrum acquired from D in a deuterated acetone solvent.

FIG. 8 shows an NMR spectrum 86 acquired from D in the deuterated acetone solvent. The NMR spectrum 86 includes, as the characteristic portion (the second characteristic portion), one signal 88 derived from D. The NMR spectrum 86 may be added as an analysis target as necessary. In the second configuration and the third configuration described below, two NMR spectra acquired from two nuclei of interest are analyzed for some solvents.

Figure 9:
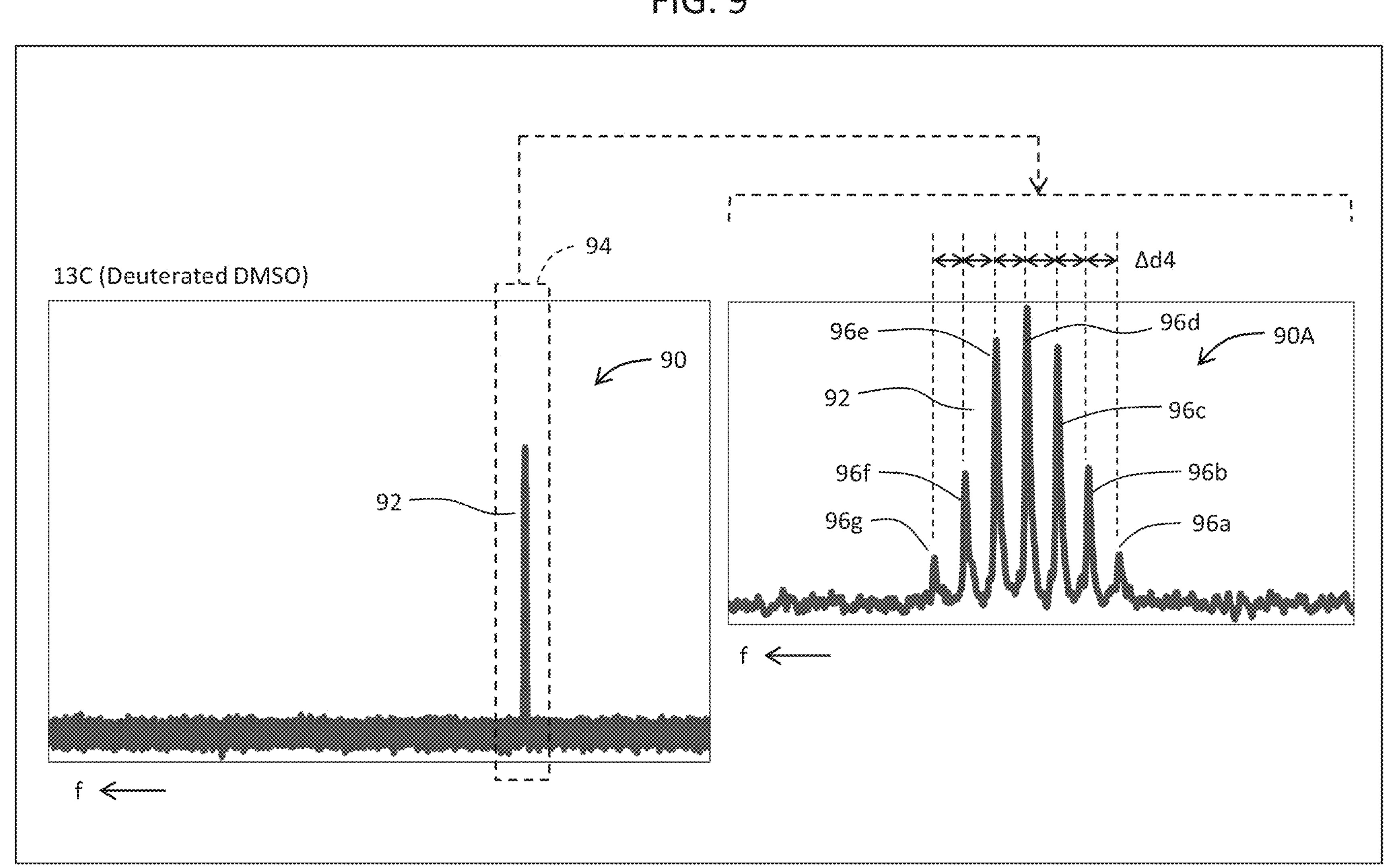
FIG. 9 is a diagram showing an NMR spectrum acquired from 13C in a deuterated DMSO solvent.

At the left of FIG. 9, there is shown an NMR spectrum 90 which is acquired from 13C in the deuterated DMSO solvent. The NMR spectrum 90 includes, as the characteristic portion, one signal 92 derived from 13C. A range shown by reference numeral 94 is enlarged and shown at the right of FIG. 9 as an enlarged NMR spectrum 90A. The signal 92 is formed from 7 peaks 96*a*~96*g* caused by splitting. The number of splits of the signal 92 is 7, and the splitting interval of the signal 92 is Δd4 (around 19.5 Hz).

Figure 10:
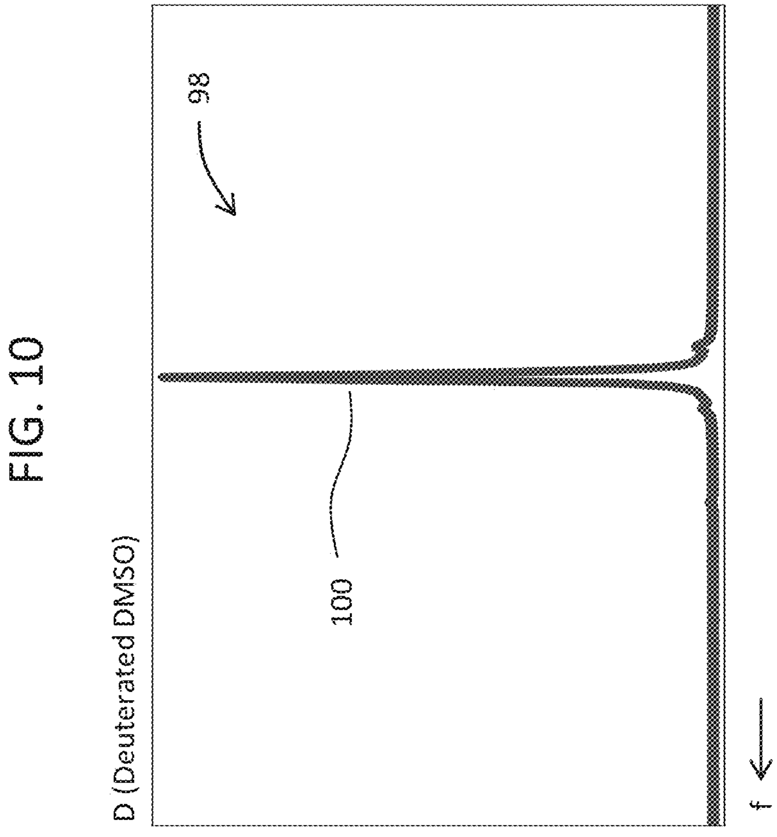
FIG. 10 is a diagram showing an NMR spectrum acquired from D in a deuterated DMSO solvent.

FIG. 10 shows an NMR spectrum 98 acquired from D in the deuterated DMSO solvent. The NMR spectrum 98 includes, as the characteristic portion (the second characteristic portion), one signal 100 derived from D. The NMR spectrum 98 may be added as the analysis target as necessary.

Figure 11:
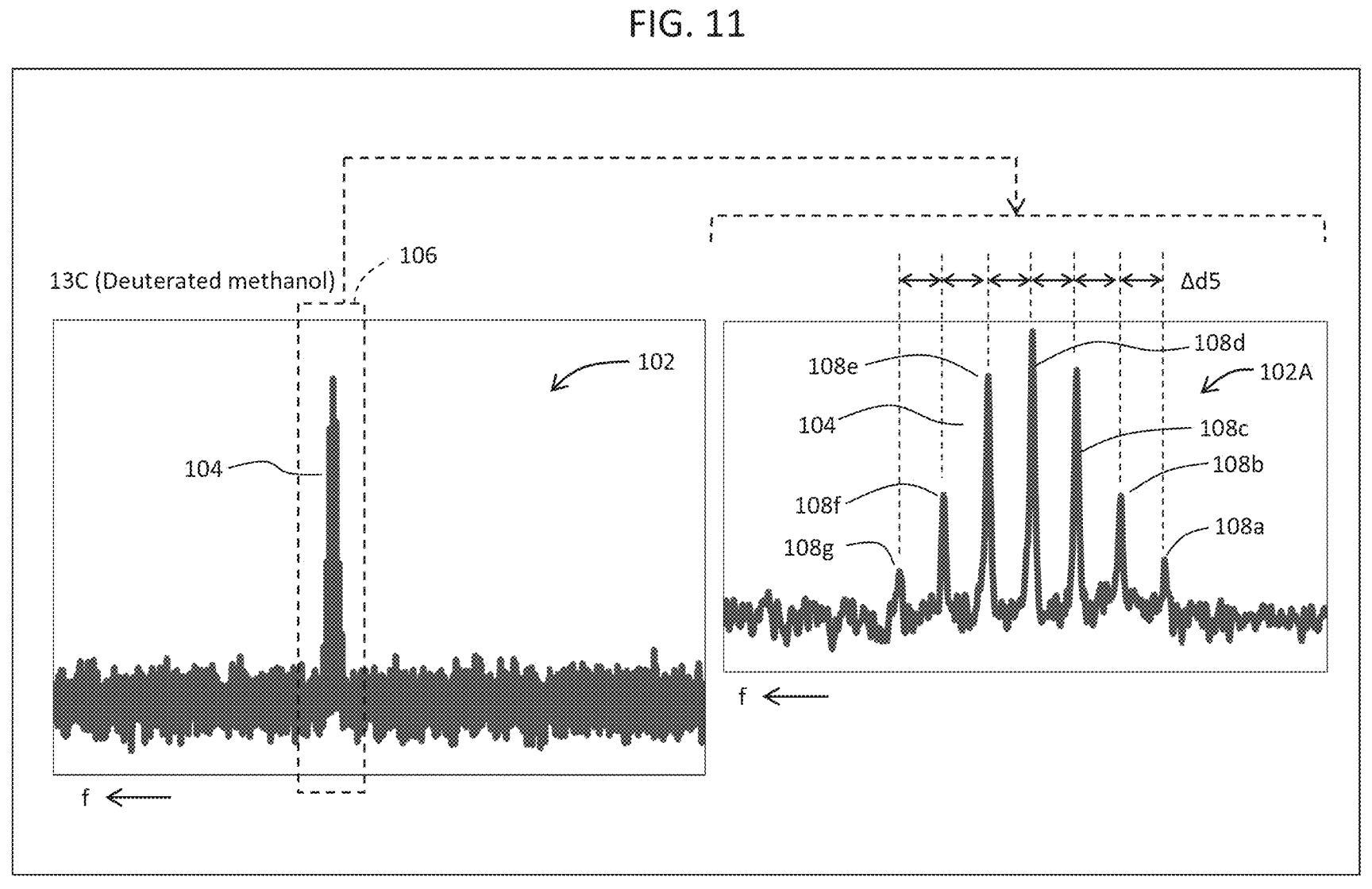

At the left of FIG. 11, there is shown an NMR spectrum 102 which is acquired from 13C in the deuterated methanol solvent. The NMR spectrum 102 includes, as the characteristic portion, one signal 104 derived from 13C. A range shown by reference numeral 106 is enlarged and shown at the right of FIG. 11 as an enlarged NMR spectrum 102A. The signal 104 is formed from 7 peaks 108*a*-108*g* caused by splitting. The number of splits of the nucleus-of-interest signal 104 is 7, and the splitting interval of the signal 104 is Δd5 (around 21.5 Hz).

Figure 12:
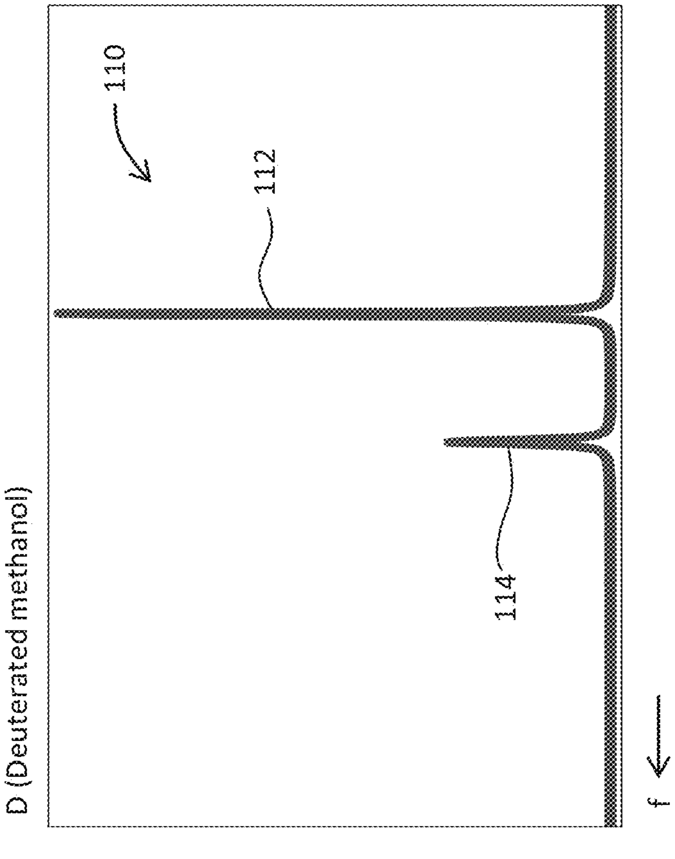
FIG. 12 is a diagram showing an NMR spectrum acquired from D in a deuterated methanol solvent.

FIG. 12 shows an NMR spectrum 110 acquired from D in the deuterated methanol solution. The NMR spectrum 110 includes, as the characteristic portion (the second characteristic portion), two signals 112, 114 derived from D. The NMR spectrum 110 may be added as the analysis target as necessary. Specifically, the number of signals forming the characteristic portion may be used as solvent identification information. Further, the signal interval may be used as the solvent identification information.

Figure 13:
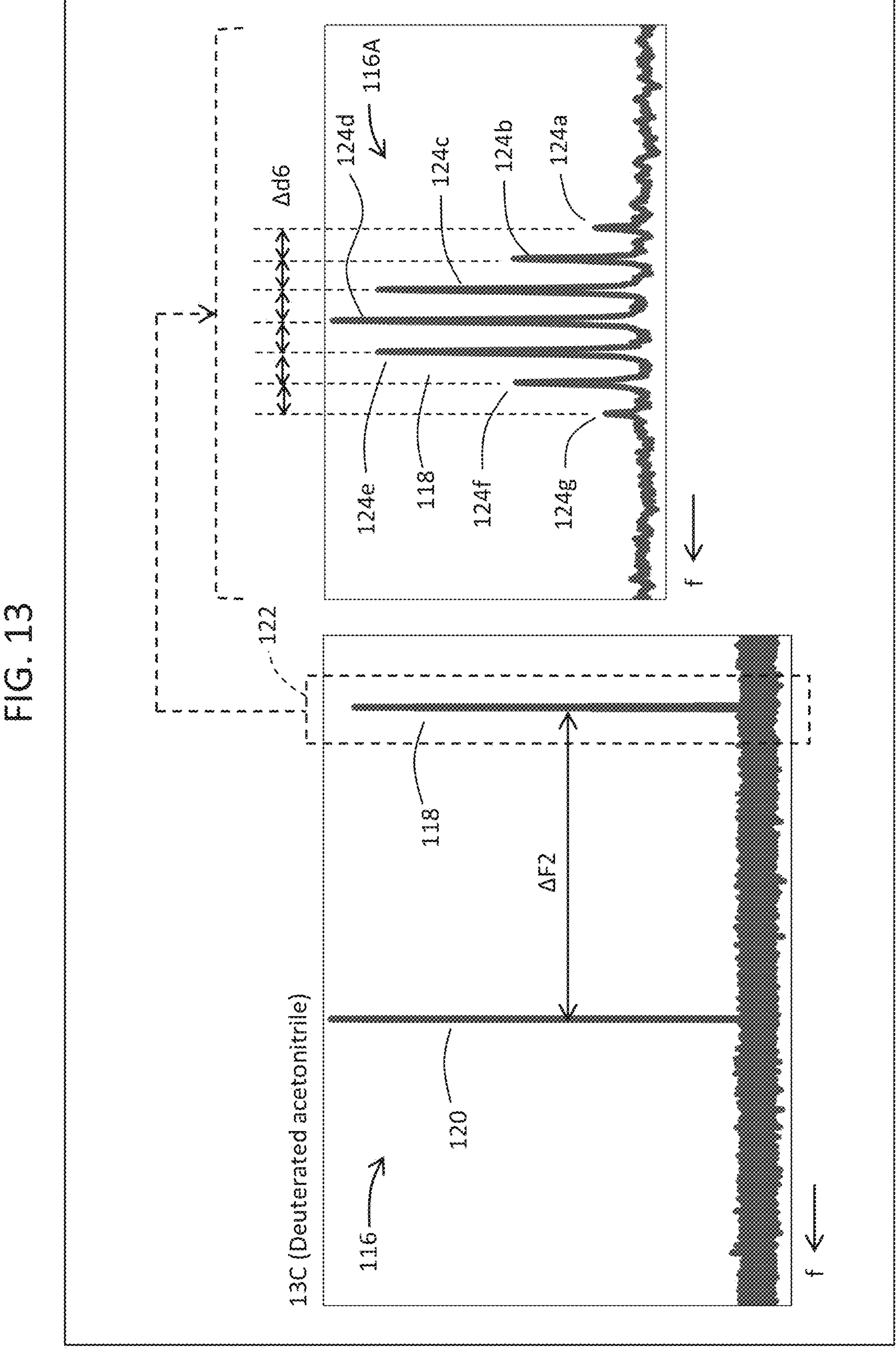
FIG. 13 is a diagram showing an NMR spectrum acquired from 13C in a deuterated acetonitrile solvent.

At the left of FIG. 13, there is shown an NMR spectrum 116 which is acquired from 13C in the deuterated acetonitrile solvent. The NMR spectrum 116 includes, as the characteristic portion, two signals 118, 120 derived from 13C. The signal interval is ΔF2 (around 14.7 kHz under a certain magnetic field intensity). A range shown by reference numeral 122 including the signal 120 at the lower frequency side is enlarged and shown at the right of FIG. 13 as an enlarged NMR spectrum 116A. The signal 118 is formed from 7 peaks 124*a*~124*g* caused by splitting. The number of splits of the signal 118 is 7, and the splitting interval of the signal 118 is Δd6 (around 20.8 Hz).

Figure 14:
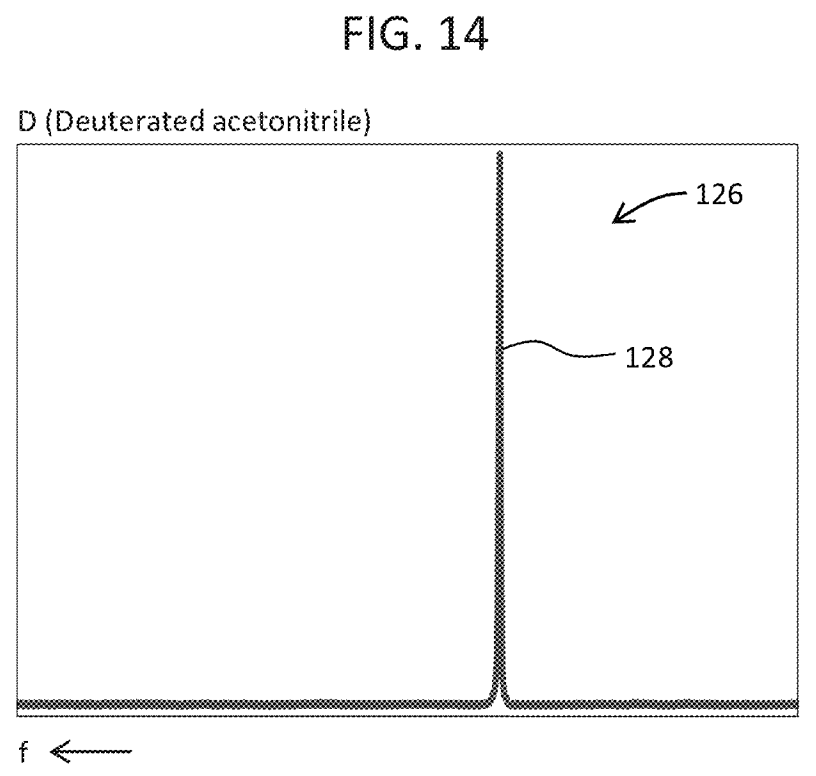

FIG. 14 shows an NMR spectrum 126 acquired from D in the deuterated acetonitrile solvent. The NMR spectrum 126 includes, as the characteristic portion, one signal 128 derived from D. The NMR spectrum 126 may be added as the analysis target as necessary.

Figure 15:
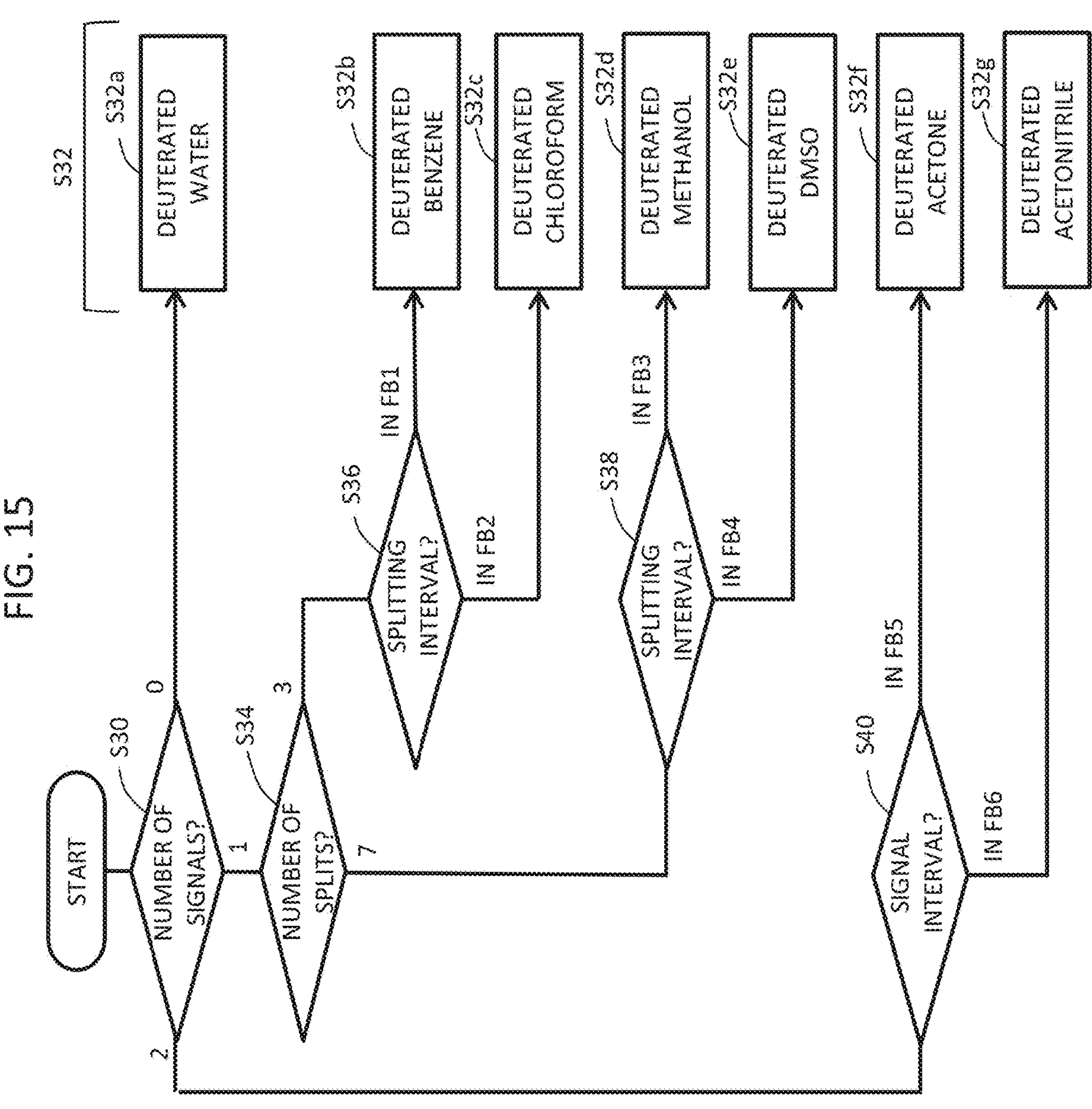
FIG. 15 is a flowchart showing a method of identifying a solvent according to a first configuration.

FIG. 15 shows the method of identifying a solvent according to the first configuration as a flowchart. FIG. 15 shows operations of the solvent identification unit shown in FIG. 1. Identifiable solvents are, as already described, the deuterated chloroform solvent, the deuterated benzene solvent, the deuterated acetone solvent, the deuterated DMSO solvent, the deuterated methanol solvent, and the deuterated acetonitrile solvent. In addition, a deuterated water solvent is also identifiable. In the first configuration, prior to the performance of the solvent identification method, an NMR spectrum from 13C included in an unknown solvent is acquired. The acquired NMR spectrum is analyzed.

In S30, it is judged whether the number of signals is 0, 1, or 2. If the number of signals is 0, it becomes known that no 13C is included, and, in an identification step S32, the solvent is identified as the deuterated water solvent (S32*a*).

If the number of signals is judged to be 1 in S30, it is judged in S34 whether the number of splits is 3 or 7. If the number of splits is not 3 or 7, solvent identification is suspended. If the number of splits is 3, in S36, it is judged whether the splitting interval belongs to a judgment range FB1 or a judgment range FB2. The judgment range FB1 is, for example, a certain range including 25 Hz, and the judgment range FB2 is, for example, a certain range including 30 Hz. If the splitting interval belongs to the judgment range FB1, in the identification step S32, the solvent is determined as the deuterated benzene solvent (S32*b*). If the splitting interval belongs to the judgment range FB2, the solvent is determined as the deuterated chloroform solvent (S32*c*). If the splitting interval does not belong to either judgment range, solvent identification is suspended.

On the other hand, if the number of splits is judged to be 7 in S34, in S38, it is judged whether the splitting interval belongs to a judgment range FB3 or a judgment range FB4. The judgment range FB3 is, for example, a certain range including 21.5 Hz, and the judgment range FB4 is, for example, a certain range including 19.5 Hz. If the splitting interval belongs to the judgment range FB3, in the identification step S32, the solvent is determined as the deuterated methanol solvent (S32*d*). If the splitting interval belongs to the judgment range FB4, the solvent is determined as the deuterated DMSO solvent (S32*e*). If the splitting interval does not belong to either judgment range, solvent identification is suspended.

If the number of signals is judged to be 2 in S30, in S40, it is judged whether the signal interval belongs to a judgment range FB5 or a judgment range FB6. The judgment range FB5 is, for example, a certain range including 22 kHz, and the judgment range FB6 is, for example, a certain range including 14.7 kHz. If the signal interval belongs to the judgment range FB5, in the identification step S32, the solvent is determined as the deuterated acetone solvent (S32*f*). If the signal interval belongs to the judgment range FB6, the solvent is determined as the deuterated acetonitrile solvent (S32*g*). If the signal interval does not belong to either judgment range, solvent identification is suspended.

As described, in the first configuration, the type of the solvent is determined based solely on the NMR spectrum of 13C. In the first configuration, the number of signals, the signal interval, the number of splits, and the splitting interval are used as the characteristic quantities for the solvent identification.

Figure 16:
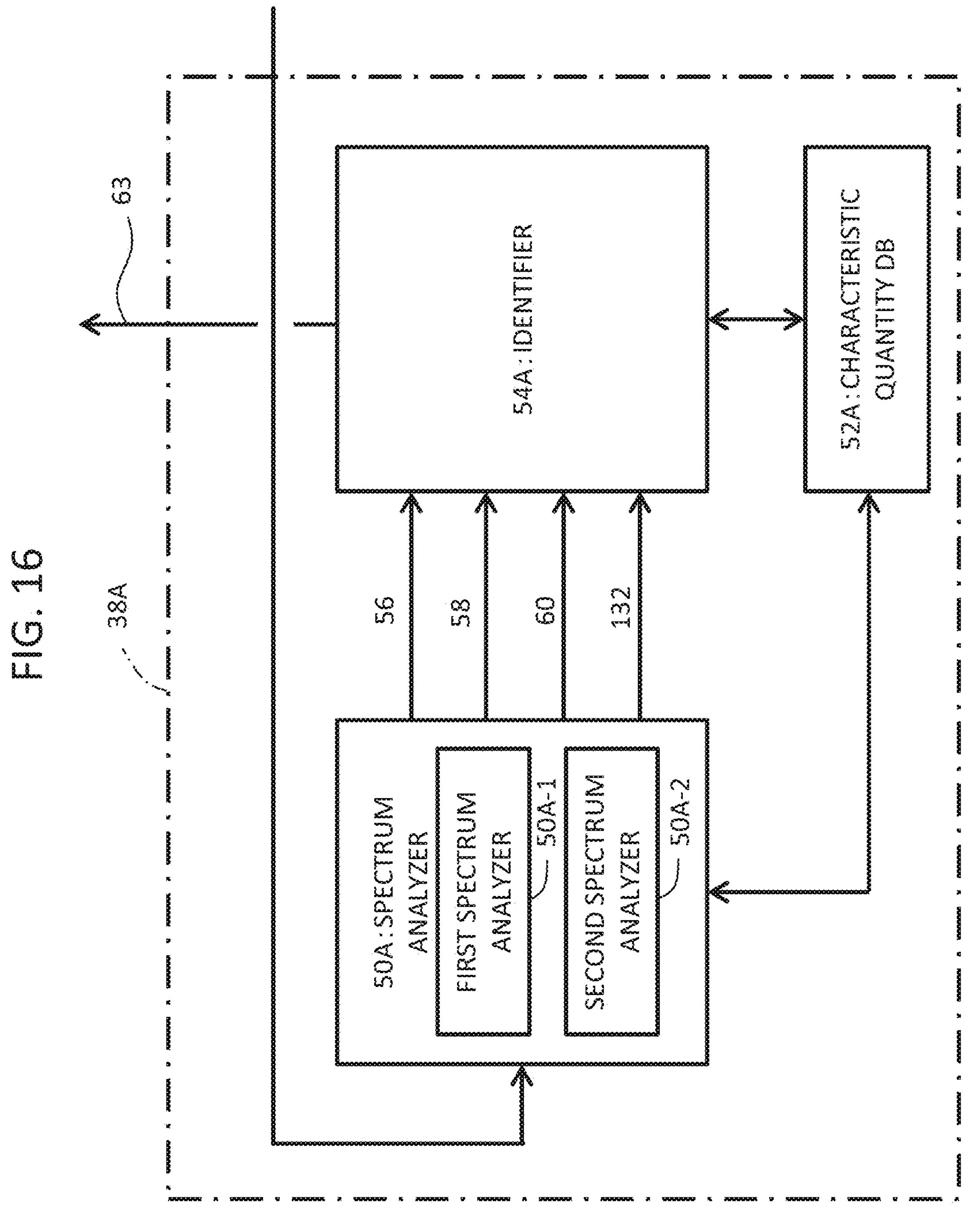
FIG. 16 is a block diagram showing a second example structure of the solvent identifying unit.

FIG. 16 shows a second example structure of the solvent identification unit. A solvent identification portion 38A shown in FIG. 16 may be used when the second configuration and the third configuration to be described below are performed. In FIG. 16, constituting elements similar to those shown in FIG. 3 are assigned the same reference numerals, and description thereof is omitted.

In FIG. 16, similar to the first example structure, the solvent identification unit 38A has a spectrum analyzer 50A, a characteristic quantity DB 52A, and an identifier 54A. The spectrum analyzer 50A has a first spectrum analyzer 50A-1 and a second spectrum analyzer 50A-2.

The first spectrum analyzer 50A-1 analyzes a first NMR spectrum acquired from 13C which is a first nucleus of interest. As a result of the analysis, the number of splits (number of splits-C) 56, the splitting interval (splitting interval-C) 58, and the number of signals (number of signals-C) 60 are identified (here, C means 13C). The second spectrum analyzer 50A-2 analyzes a second NMR spectrum acquired from D which is a second nucleus of interest. As a result of the analysis, the number of signals (number of signals-D) 132 is identified (here, D means deuterium).

In the characteristic quantity DB 52A, a plurality of characteristic quantities are managed for each solvent. The plurality of characteristic quantities include the number of splits-C, the splitting interval-C, the number of signals-C, and the number of signals-D.

The identifier 54A identifies the solvent while referring to the characteristic quantity DB 52A and based on the analysis result of the spectrum analyzer 50A. The solvent identifier 63 is output from the identifier 54A to the main controller.

FIG. 17 shows the method of identifying a solvent of the second configuration as a flowchart. Prior to the performance of the solvent identification method, a first NMR spectrum is acquired from 13C in an unknown solvent, and a second NMR spectrum is acquired from D in the unknown solvent. In FIG. 17, steps similar to those shown in FIG. 15 are assigned the same reference numerals.

In S30, it is judged whether the number of signals in the first NMR spectrum; that is, the number of signals-C, is 0, 1, or 2. If the number of signals-C is 0, in S42, it is judged whether the number of signals in the second NMR spectrum; that is, the number of signals-D, is 1 or 0. If the number of signals-D is 1, in the identification step S32, the solvent is identified as the deuterated water solvent (S32*a*). If the number of signals-D is 0, solvent identification is suspended (S32*h*).

If the number of signals-C is 1 in S30, in S34, it is judged whether the number of splits in the first NMR spectrum; that is, the number of splits-C, is 3 or 7. If the number of splits-C is 3, in S36, it is judged whether the splitting interval in the first NMR spectrum; that is, the splitting interval-C, belongs to the judgment range FB1 or the judgment range FB2. If the splitting interval-C belongs to the judgment range FB1, in the identification step S32, the solvent is identified as the deuterated benzene solvent (S32*b*). If the splitting interval-C belongs to the judgment range FB2, in the identification step S32, the solvent is identified as the deuterated chloroform solvent (S32*c*).

If the number of splits-C is judged to be 7 in S34, in S44, it is judged whether the number of signals in the second NMR spectrum; that is, the number of signals-D, is 2, 1, or 0. If the number of signals-D is 2, in the identification step S32, the solvent is identified as the deuterated methanol solvent (S32*d*). If the number of signals-D is 1, in the identification step S32, the solvent is identified as the deuterated DMSO solvent (S32*e*). If the number of signals-D is 0, in the identification step S32, solvent identification is suspended (S32*i*).

On the other hand, if the number of signals-C is judged to be 2 in S30, in S46, it is judged whether the signal interval-C belongs to the judgment range FB5, the judgment range FB6, or other ranges. The judgment range FB5 is, for example, a certain range including 22 kHz. The judgment range FB6 is, for example, a certain range including 14.7 kHz. If the signal interval-C belongs to the judgment range FB5, in the identification step S32, the solvent is determined as the deuterated acetone solvent (S32*f*). If the signal interval-C belongs to the judgment range FB6, the solvent is determined as the deuterated acetonitrile solvent (S32*g*). If the signal interval-C does not belong to either judgment range, solvent identification is suspended (S32*j*).

As described, according to the second configuration, the solvent can be identified in consideration of the second NMR spectrum in addition to the first NMR spectrum, and thus, solvent identification precision can be improved.

FIG. 18 shows a solvent identification step in the third configuration as a flowchart. Prior to the performance of the solvent identification method, a first NMR spectrum is acquired from 13C in the solvent, and a second NMR spectrum is acquired from D in the solvent.

In S50, it is judged whether the number of signals in the second spectrum; that is, the number of signals-D, is 2, 1, or 0. If the number of signals-D is 2, in S52, it is judged whether or not the number of signals in the first NMR spectrum; that is, the number of signals-C, is 1. If the number of signals-C is 1, in the identification step S32, the solvent is identified as the deuterated methanol solvent (S32*d*). If the number of signals-C is other than 1, solvent identification is suspended (S32*k*).

If the number of signals-D is judged to be 1 in S50, in S54, it is judged whether the number of signals in the first NMR spectrum; that is, the number of signals-C, is 0, 1, or 2. If the number of signals-C is judged to be 2 in S54, in step S59, it is judged whether the signal interval-C belongs to the judgment range FB5 or the judgment range FB6. The judgment range FB5 is, for example, a certain range including 22 kHz. The judgment range FB6 is, for example, a certain range including 14.7 kHz. If the signal interval-C belongs to the judgment range FB5, in the identification step S32, the solvent is determined as the deuterated acetone solvent (S32*f*). If the signal interval-C belongs to the judgment range FB6, the solvent is determined as the deuterated acetonitrile solvent (S32*g*). If the signal interval-C does not belong to either judgment range, solvent identification is suspended. If the number of signals-C is 0 in S54, in the identification step S32, the solvent is identified as the deuterated water solvent (S32*a*).

If the number of signals-C is judged to be 1 in S54, in S56, it is judged whether the number of splits in the first NMR spectrum; that is, the number of splits-C, is 3 or 7. If the number of splits-C is judged to be 3, in S58, it is judged whether the splitting interval in the first NMR spectrum; that is, the splitting interval-C, belongs to the first judgment range FB1 or the second judgment range FB2. If the splitting interval-C belongs to the first judgment range FB1, in the identification step S32, the solvent is identified as the deuterated benzene solvent (S32*b*). If the splitting interval-C belongs to the judgment range FB2, in the identification step S32, the solvent is identified as the deuterated chloroform solvent (S32*c*).

If the number of splits-C is judged to be 7 in S56, in the identification step S32, the solvent is identified as the deuterated DMSO solvent (S32*e*). If the number of signals-D is judged to be 0 in S50, in the identification step S32, solvent identification is suspended (S321).

As described, according to the third configuration, similar to the second configuration, the solvent can be identified in consideration of the second NMR spectrum in addition to the first NMR spectrum, and thus, the solvent identification precision can be improved.

Figure 19:
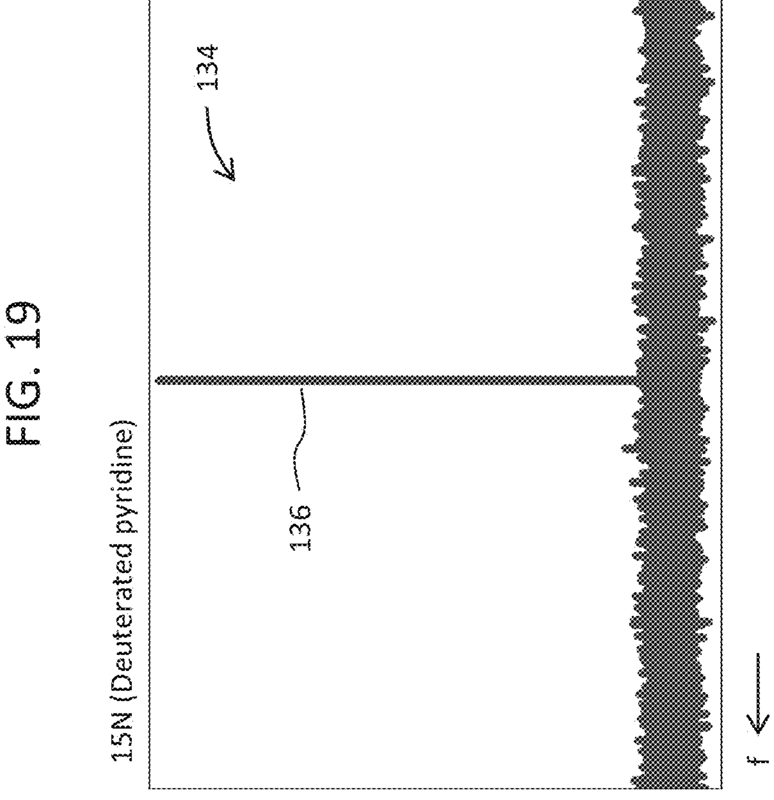
FIG. 19 is a diagram showing an NMR spectrum acquired from 15N in a deuterated pyridine solvent.

Alternatively, an element other than 13C and D may be set as the measurement target. For example, for a solvent which includes nitrogen such as a deuterated pyridine solvent, 14N or 15N may be set as the measurement target. FIG. 19 shows an NMR spectrum 134 acquired from 15N in the deuterated pyridine solvent under performance of proton decoupling. The NMR spectrum 134 includes one signal 136 corresponding to 15N. By identifying the presence of the signal 136, it can be judged that the solvent includes 15N, and, based on this judgment result, the solvent can be identified as the deuterated pyridine solvent. Alternatively, the number of signals or the like in an NMR spectrum acquired from an element other than 13C and D may be taken into consideration.

According to the above-described configurations, an advantage can be obtained in that a reference solution separate from the sample solution does not need to be prepared. According to the above-described configurations, for a mixture solvent formed from a plurality of solvents, each individual solvent can be identified. As already described, after the solvent is identified, resolution adjustment and NMR locking are performed using information such as the reference frequency corresponding to the solvent.

The invention claimed is:

1. An NMR measurement apparatus comprising at least one processor configured to:
- acquire an NMR spectrum from a nucleus of interest in a solvent included in a sample solution, the NMR spectrum comprising a characteristic portion intrinsic to the nucleus of interest;
- analyze the characteristic portion, to thereby identify splitting information for a particular nucleus-of-interest signal included in the characteristic portion, wherein the splitting information comprises a number of splits and a splitting interval;
- identify the solvent based on the number of splits and the splitting interval;
- identify a reference frequency based on the solvent; and
- control the NMR measurement apparatus to perform a shim adjustment to increase a uniformity of a static magnetic field of the sample based on the reference frequency.

2. The NMR measurement apparatus according to claim 1, wherein the at least one processor is further configured to:
- identify a number of nucleus-of-interest signals forming the characteristic portion; and
- identify the solvent based on the number of nucleus-of-interest signals.

3. The NMR measurement apparatus according to claim 2, wherein the at least one processor is further configured to:
- identify a signal interval in the characteristic portion; and
- identify the solvent based on the signal interval.

4. The NMR measurement apparatus according to claim 1,
- wherein the nucleus of interest is a first nucleus of interest;
- wherein the NMR spectrum is a first NMR spectrum comprising a first characteristic portion intrinsic to the first nucleus of interest; and
- wherein the at least one processor is further configured to:
  - acquire the first NMR spectrum;

acquire, from a second nucleus of interest included in the solvent, a second NMR spectrum comprising a second characteristic portion intrinsic to the second nucleus of interest;

analyze the first NMR spectrum, to thereby identify a number of nucleus-of-interest signals forming the first characteristic portion;

analyze the second NMR spectrum, to thereby identify a number of nucleus-of-interest signals forming the second characteristic portion; and identify the solvent based on the splitting information, the number of the nucleus-of-interest signals forming the first characteristic portion, and the number of the nucleus-of-interest signals forming the second characteristic portion.

5. The NMR measurement apparatus according to claim 4, wherein the first nucleus of interest is an atomic nucleus of an element other than deuterium, and the second nucleus of interest is an atomic nucleus of deuterium.

6. The NMR measurement apparatus according to claim 1, wherein the at least one processor is further configured to:

manage, using a solvent table, a plurality of reference frequencies, wherein the reference is identified based on the solvent table, and wherein an operation of the NMR measurement apparatus is adjusted according to the reference frequency.

7. A method of identifying a solvent, the method comprising:

acquiring, from a nucleus of interest in a solvent included in a sample solution, an NMR spectrum comprising a characteristic portion intrinsic to the nucleus of interest;

analyzing the characteristic portion, to thereby identify splitting information for a particular nucleus-of-interest signal included in the characteristic portion, wherein the splitting information comprises a number of splits and a splitting interval;

identifying the solvent based on the number of splits and the splitting interval;

identifying a reference frequency based on the solvent; and controlling an NMR measurement apparatus to perform a shim adjustment to increase a uniformity of a static magnetic field of the sample solution based on the reference frequency.

* * * * *